United States Patent [19]

Knox et al.

[11] Patent Number: 5,640,502

[45] Date of Patent: Jun. 17, 1997

[54] BIT-MAPPED ON-SCREEN-DISPLAY DEVICE FOR A TELEVISION RECEIVER

[75] Inventors: Michael Dwayne Knox; Aaron Hal Dinwiddie, both of Fishers; David Jay Duffield; Paul Dean Filliman, both of Indianapolis, all of Ind.

[73] Assignee: Thomson Consumer Electronics, Inc., Indianapolis, Ind.

[21] Appl. No.: 286,865

[22] Filed: Aug. 5, 1994

[51] Int. Cl.$^6$ ............................ G06F 12/00; G06F 12/06; G06F 15/00

[52] U.S. Cl. ........................ 395/507; 395/515; 345/185; 345/189; 345/199; 345/150

[58] Field of Search ........................................ 395/162–166; 345/185, 189, 199, 150, 153; 348/569, 575, 714–716

[56] References Cited

U.S. PATENT DOCUMENTS

| | | | |
|---|---|---|---|
| 4,799,053 | 1/1989 | Van Aken et al. | 345/199 |
| 5,297,271 | 3/1994 | Bhayani | 395/164 |
| 5,353,402 | 10/1994 | Lau | 395/162 |
| 5,420,609 | 5/1995 | Izzi et al. | 345/190 |

OTHER PUBLICATIONS

Relevant pages of M68000 8-/16-/32-Bit Microprocessors User's Manual.

Apple II Reference Manual, Apple Computer, Inc, pp. 12, 13, 18–21, 68, 69, 130, 131.

Relevant pages of M5M482128AJ,TP,RT-7, -8, 10.

Primary Examiner—Mark R. Powell
Assistant Examiner—U. Chauhan
Attorney, Agent, or Firm—Joseph S. Tripoli; Peter M. Emanuel; Thomas F. Lenihan

[57] ABSTRACT

In order to increase the speed of the transfer of control data to an OSD circuit, and to eliminate "holes" in memory caused by the use of memory mapped registers, dual use is made of the serial data port of the OSD circuit to accomplish two distinct tasks, serial transfer of graphics data and serial transfer of the control data. The on-screen display apparatus includes an OSD circuit for generating an graphics signal for display on a display screen, a controller coupled to the OSD circuit, for controlling the OSD circuit, and a VRAM including a first area for storing graphics data and a second area for storing control data for the OSD circuit. The VRAM has a parallel input/output port coupled to the controller and a serial output port coupled to the OSD circuit, the serial output port conveys the graphics data from the first area of the VRAM to the OSD circuit for processing and display. The controller writes the control data to the second area of the VRAM via the input/output port and the OSD circuit reads the control data from the VRAM via the serial output port during each vertical sync interval.

8 Claims, 8 Drawing Sheets

| POSITION NO. | BYTE NAME | CONTENTS |
|---|---|---|
| 00 | INIT BYTE | XX XX VP HP XX VR TP OE |
| 01 | FRAME CONTROL BYTE | XX XX D1 D0 HS V1 X1 X0 |
| 02 | PIXEL DELAY (LSB) | |
| 03 | PIXEL DELAY (MSB) | |
| 04 | STARTING ADDRESS (LSB) | |
| 05 | STARTING ADDRESS (MSB) | |
| 06 | STARTING LINE NUMBER (LSB) | |
| 07 | STARTING LINE NUMBER (MSB) | |
| 08 | ENDING LINE NUMBER (LSB) | |
| 09 | ENDING LINE NUMBER (MSB) | |
| 10 | LEFT PIXEL NUMBER (LSB) | |
| 11 | LEFT PIXEL NUMBER (MSB) | |
| 12 | RIGHT PIXEL NUMBER (LSB) | |
| 13 | RIGHT PIXEL NUMBER (MSB) | |
| 14 | UNUSED | |
| 15 | BORDER COLOR | |
| 16 | COLOR 0 (LSB) | |
| 17 | COLOR 0 (MSB) | |
| 18 | COLOR 1 (LSB) | |
| 19 | COLOR 1 (MSB) | |
| 20 | COLOR 2 (LSB) | |
| 21 | COLOR 2 (MSB) | |
| 22 | COLOR 3 (LSB) | |
| 23 | COLOR 3 (MSB) | |
| 24 | COLOR 4 (LSB) | |
| 25 | COLOR 4 (MSB) | |
| 26 | COLOR 5 (LSB) | |
| 27 | COLOR 5 (MSB) | |
| 28 | COLOR 6 (LSB) | |
| 29 | COLOR 6 (MSB) | |
| 30 | COLOR 7 (LSB) | |
| 31 | COLOR 7 (MSB) | |
| 32 | COLOR 8 (LSB) | |
| 33 | COLOR 8 (MSB) | |
| 34 | COLOR 9 (LSB) | |
| 35 | COLOR 9 (MSB) | |
| 36 | COLOR 10 (LSB) | |
| 37 | COLOR 10 (MSB) | |
| 38 | COLOR 11 (LSB) | |
| 39 | COLOR 11 (MSB) | |
| 40 | COLOR 12 (LSB) | |
| 41 | COLOR 12 (MSB) | |
| 42 | COLOR 13 (LSB) | |
| 43 | COLOR 13 (MSB) | |
| 44 | COLOR 14 (LSB) | |
| 45 | COLOR 14 (MSB) | |
| 46 | COLOR 15 (LSB) | |
| 47 | COLOR 15 (MSB) | |

FIG. 7

| BIT NO. | INIT BYTE BIT NAME | CONTENTS |
|---|---|---|
| 7 | UNUSED | |
| 6 | UNUSED | |
| 5 | VP VERTICAL SYNC POLARITY | 0 = NEGATIVE POLARITY<br>1 = POSITIVE POLARITY |
| 4 | HP HORIZONTAL SYNC POLARITY | 0 = NEGATIVE POLARITY<br>1 = POSITIVE POLARITY |
| 3 | UNUSED | |
| 2 | VR SKEW CORRECTOR CONTROL | 0 = SKEW CORRECTOR ENABLED<br>1 = SKEW CORRECTOR DISABLED |
| 1 | TR TRANSPARENCY POLARITY<br>(FAST BLINKING POLARITY) | 0 = NEGATIVE POLARITY<br>1 = POSITIVE POLARITY |
| 0 | OSD ENABLE | 0 = DISABLE OSD<br>1 = ENABLE OSD |

FIG. 8a

| BIT NO. | FRAME CONTROL BYTE BIT NAME | CONTENTS |
|---|---|---|
| 7 | UNUSED | |
| 6 | UNUSED | |
| 5,4 | D1D0 CLOCK SELECTION | 00 = DIVIDE OSC CLOCK BY 1<br>01 = DIVIDE OSC CLOCK BY 2<br>10 = DIVIDE OSC CLOCK BY 4<br>11 = DIVIDE OSC CLOCK BY 8 |
| 3 | HS HORIZONTAL SCAN RATE | 0 = 1H<br>1 = 2H |
| 2 | VI VERTICAL INTERLACE | 0 = NON-INTERLACED<br>1 = INTERLACED |
| 1,0 | X1X0 MAGNIFICATION FACTOR | 00 = 1X<br>01 = 2X<br>10 = 4X |

FIG. 8a

BIT-MAPPED ON-SCREEN-DISPLAY DEVICE FOR A TELEVISION RECEIVER

FIELD OF THE INVENTION

The subject invention concerns the field of graphics on-screen display devices for television receivers.

BACKGROUND OF THE INVENTION

Bit-mapped video memory for graphics display is well-known in computer systems. For example, a bit-mapped approach to graphics display was used in the Apple II computer, manufactured during from late 1970's to the mid 1980's by Apple Computer Corp., Cupertino, Calif. Briefly, the individual storage locations of a video memory are arranged (at least in the mind of the programmer) as an array of N rows each comprising M bytes. A predetermined number of bits of each byte is associated with a unique pixel (picture element). That is, in a monochrome display, each pixel might be represented by a single bit (i.e., pixel on or off), thus data for eight pixels could be stored in a single byte. However, in a color display, each pixel would require at least 1 bit (and probably more) of color information for each of the primary colors of red, green, and blue, thus, requiring more video memory for each pixel.

Modern on-screen display controllers utilize the concept of a color palette to increase the numbers of colors available to a programmer. In order to more easily understand this concept, consider the following. When an artist is creating a painting, he uses a physical palette to hold a dab (i.e., a small portion) of each of a variety of colors which he is most likely to need in the near future. If the artist finds that he needs other colors (and if his currently-held palette is full), he must change to another palette containing the new colors. In this way, the artist does not have to have immediate access to all colors at all times. Similarly, in electronic graphics, the on-screen display integrated circuit (OSD IC) uses a palette concept to avoid having to provide immediate access to all colors at all times. In the palette approach a pixel color is defined by four bits which form an address which, in turn, points to one of sixteen color-storage locations on the palette. Each location on the palette stores data indicating the amount of red (R), green (G), and blue (B) which make up a particular color. For example, each color stored in each of the sixteen locations on the palette may comprise twelve bits, four bits for red, four bits for green, and four bits for blue. If the programmer finds that he needs yet another (i.e., seventeenth) color, then he must reload his palette with data defining the different desired colors. In this way, VRAM memory space is conserved in that only 4 bits/pixel are used to define a palette location holding particular color data, rather than 12 bits/pixel to define a particular pixel color directly.

Unfortunately, the above-noted memory saving must be paid for at the expense of the time in which it takes to reload the color palette, and to load the OSD IC with other necessary control data. Typically, prior art OSD ICs used memory mapped registers to hold color palette and control data. These registers were written-to, by a control microprocessor, as if they were memory locations, and they did indeed logically occupy those locations, often creating unwanted "holes" in memory (i.e., discontinuities in the memory address space). These "holes" can be particularly troublesome when large blocks of contiguous memory locations are needed to hold graphics information.

Graphics data are written to the VRAM by the control microprocessor via a parallel port in a direct access fashion, but are read out to the OSD chip via a higher speed serial port. Graphics displays use a relatively large amount of video memory (VRAM), typically 1 Mbit 4–Mbits (128 kbytes–512 kbytes) in size. It requires a total of 17 to 19 address lines to uniquely address an 8-bit memory location within memory chips this large. In order to limit the physical size of the VRAM chip, it is commonplace in VRAM to limit the number of address pins to a lesser number, such as 9, and to time-multiplex the address lines. Such a VRAM is the M5M482128ATP, manufactured by Mitsubishi Corp. Because of the multiplexing of the address lines, the time it takes to address a particular byte in a 1-Mbit VRAM is extended because it takes two transfers of address data (i.e., A16–A8 (9 bits) followed by A7–A0 (the remaining 8 bits)) before a read or write can be done at any location. This extension of time becomes significant when one considers that the amount of control data and palette data to be transferred may total as much as 48 bytes, with each transfer taking approximately 400 nanoseconds (ns) per byte, for a total of approximately 19.2 microseconds (μs) during which time the control microprocessor is excluded from the system bus. This is especially significant when one realizes that this data is typically transferred to the OSD IC during each television vertical interval, when the control microprocessor also needs access to the system bus to load the VRAM with graphics data for the next active video display.

SUMMARY OF THE INVENTION

In order to increase the speed of the transfer of control data to the on-screen display means, and to eliminate the "holes" in memory caused by the use of memory mapped registers, it is herein recognized that dual use should be made of the serial data port to accomplish two distinct tasks, serial transfer of image-representative video data and serial transfer of the control data. To accomplish this end, an on-screen display apparatus includes an on-screen display means for generating an image signal for display on a display screen, a control means, coupled to said on-screen display means, for controlling said on-screen display means to produce said image signal, and a memory means including a first area for storing image-representative data and a second area for storing control data for controlling said on-screen display means.

The memory means has an input/output port coupled to the control means and a serial output port coupled to the on-screen display means, the serial output port conveys the image-representative data from the first area of the memory means to the on-screen display means for processing and display.

The control means writes the control data to the second area of said memory means via the input/output port and the on-screen display means reads the control data from the memory means via the serial output port.

BRIEF DESCRIPTION OF THE DRAWING

FIG. 7 is an illustration of a portion of the VRAM of FIG. 1 showing the contents of relevant memory locations.

FIGS. 8a and 8b are illustrations in greater detail of the contents of particular memory locations of the portion of VRAM shown in FIG. 7.

DETAILED DESCRIPTION OF THE EMBODIMENTS

Figure 1:
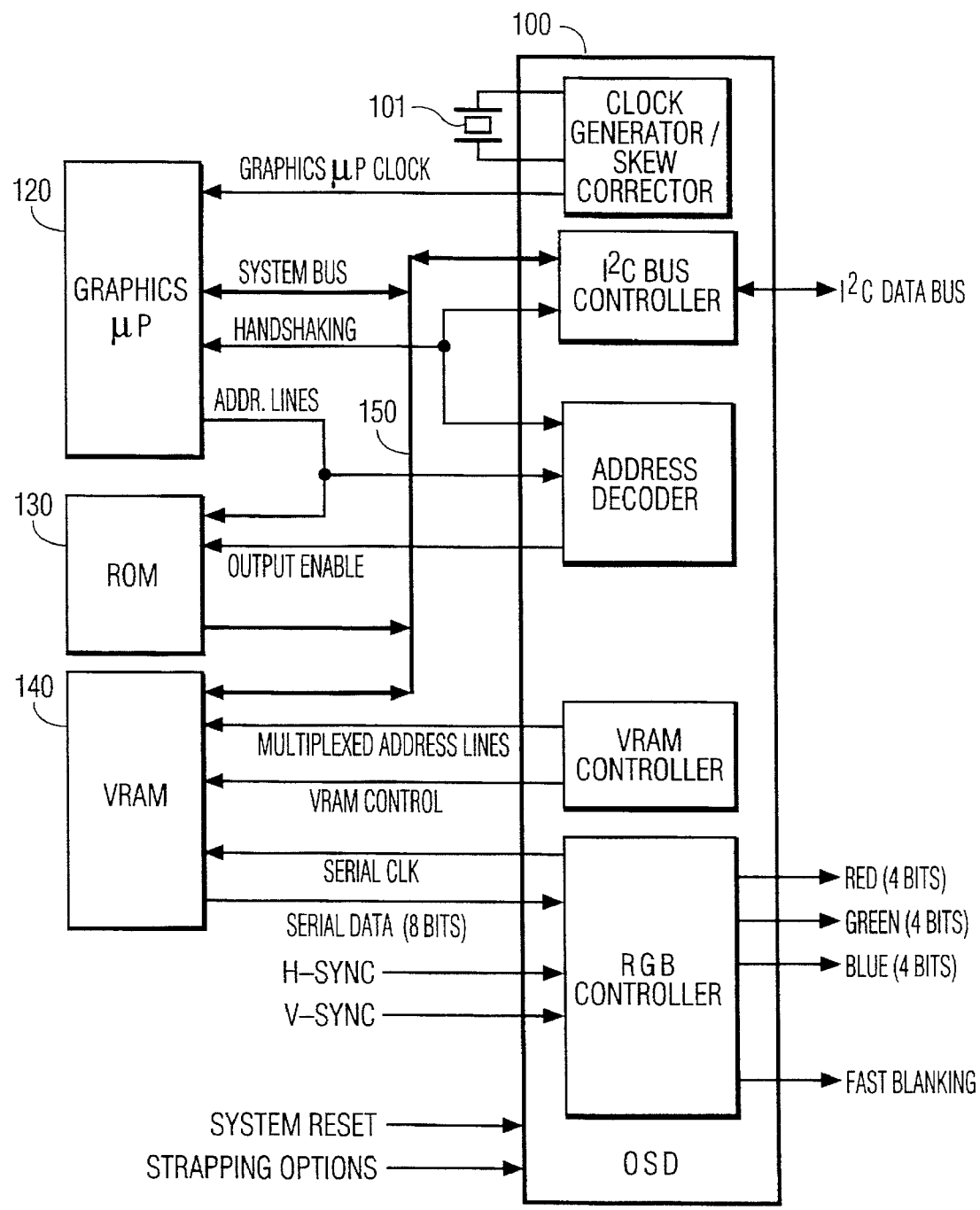
FIG. 1 shows, in block diagram form, an on-screen display apparatus suitable for use with the invention.

The graphics system of FIG. 1 resides within a television receiver (not shown), and generates images for display on a display screen. The term television receiver, as used herein, includes television receivers having a display screen (commonly called TV sets), and television receivers without a display screen, such as VCRs (videocassette recorders), VCPs (videocassette players), and Videodisc players. The graphics system of FIG. 1 includes an OSD (on-screen display) processor circuit 100 operating under control of a Graphics microprocessor (µp) 120 which may be, for example, a Motorola 68008, a ROM (read-only memory) 130, and a VRAM (video random access memory) 140. OSD processor 100 generates its own clock signals, and those for graphics µp 120, at a frequency determined by a crystal 101, and includes a skew corrector for adjusting the relationship between the clock signals and deflection (horizontal and vertical) signals supplied by the television receiver deflection circuitry (not shown). Communication between OSD processor 100, Graphics µp 120, ROM 130 and VRAM 140 is conveyed over an internal system bus 150.

Communication between the graphics system and a television receiver controller (not shown) for the television receiver is carried out via a data bus known in the industry as the I²C bus. The television controller and Graphics µp 120 pass commands and data via the I²C bus. It is important to note that OSD controller 100 provides the link to the I²C bus for a graphics control microprocessor such as the Motorola 68008, which has no I/O capability. OSD processor 100 acts as a "slave" device on the I²C bus, with the television receiver controller acting as the bus controller. Commands and data sent from the television receiver controller are read from the I²C bus by OSD processor 100 and placed in VRAM memory for Graphics µp 120 to read. Similarly, the television receiver controller can request data from OSD processor 100 at specific addresses. Thus, a "mailbox" system is established in which messages can be passed between the television receiver controller and Graphics µp 120.

Output signals from OSD processor 100 are applied to the video processing portion (not shown) of the television receiver. These output signals are digital in nature, and include four bits each of red (R), green (G), and blue (B) color information and a fast blanking signal. The main purpose of the fast blanking signal is to quickly blank the video signal so that the graphics signal can be inserted without generating undesirable artifacts on the display screen. An additional use of the fast blanking signal is to control the rapid alternation of graphics information with video information, thereby creating the effect of transparent graphics. Several of the signal lines (i.e., handshaking, output enable, VRAM control, multiplexed address lines, System Reset) are known per se, by those skilled in the art, need no detailed explanation, and are included merely for completeness.

The line identified as STRAPPING OPTIONS is in reality a group of lines, each of which may be connected to a high logic level or a low logic level source of potential to impress upon OSD processor 100 one of a number of binary codes. Each of the binary codes controls the selection of an operating mode of OSD processor 100, such as clock speed, and memory size.

VRAM 140 is a dual port video RAM. As such, it includes both a parallel data port, and an eight-bit wide serial data port (SAM Port (Serial Access Memory Port). That is, eight bits of data are shifted out of VRAM 140 on every positive-going transition of the SERIAL CLOCK signal. The above-noted M5M482128ATP VRAM chip can transfer data serially at clock speeds up to 33 MHz. This high speed serial transfer capability of VRAM 140 is important to the subject invention and will be further discussed below. VRAM 140 is organized as rows of consecutive bytes. A 1 Mbit version of VRAM 140 contains 512 rows with each row containing 256 bytes, for a total of 128 Kbytes. A 2 Mbit version of VRAM 140 contains 512 rows with each row containing 512 bytes, for a total of 256 Kbytes. A 4 Mbit version of VRAM 140 contains 1024 rows with each row containing 512 bytes, for a total of 512 Kbytes. The SAM port is organized as a long row of eight-bit parallel shift registers. When OSD processor 100 performs a VRAM serial transfer, an entire row of memory is loaded into the SAM port. Once the data is transferred, consecutive bytes can be shifted out at a very fast rate (eight bits at a time), using the serial clock. Advantageously, while the data are being shifted out, Graphics µp 120 can access VRAM 140 via the parallel port of VRAM 140. In this regard, another task which OSD processor 100 performs is address decoding for Graphics µp 120 to allow it to read and write data from and to VRAM 140 (and any other RAM which may be installed in the system).

OSD processor 100 must be initialized prior to use in order that the proper operating mode be established and the proper colors loaded into the color palette. Turning to FIG. 7, for a moment, there is displayed a list of forty-eight bytes of initialization data (including thirty-two bytes of color palette information) which must be conveyed to OSD processor 100 at the beginning of each vertical interval for controlling the graphics display during that particular television field. As noted above, a parallel transfer of that data from VRAM 140 (or perhaps another data storage RAM, or group of memory-mapped registers) would take approximately 19.2 µs (microseconds), which is an undesirably long time to "tie-up" the bus (i.e., exclude Graphics µp 120 from the bus). The position number of each byte refers to its relative address in row zero of VRAM 140.

Figure 2:
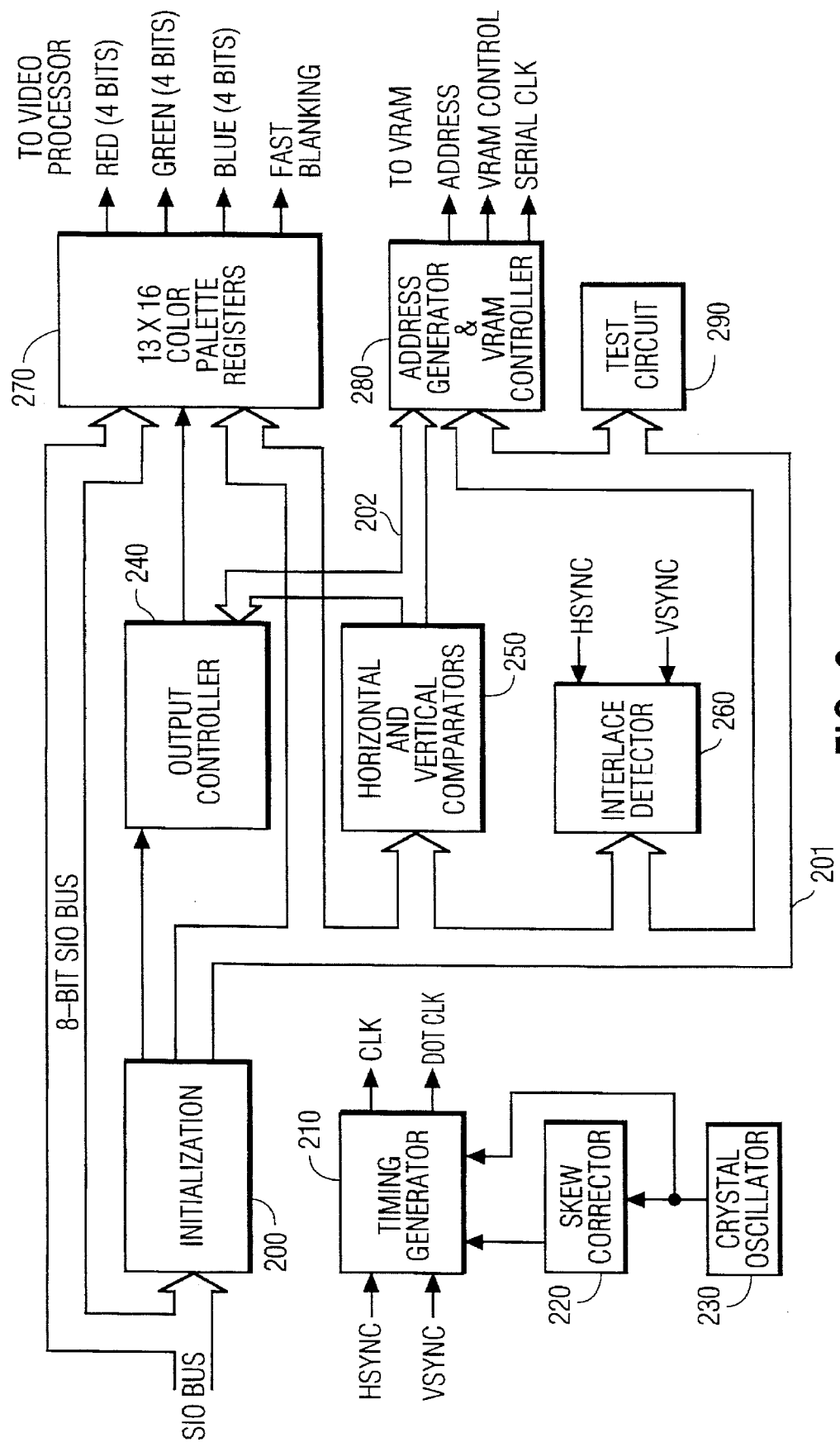
FIG. 2 shows, in block diagram form, a more detailed view of the OSD device of FIG. 1.

It is herein recognized that the novel architecture of OSD processor 100 of the subject invention allows the use of the high speed data transfer capabilities of VRAM 140 for transferring the initialization data to the internal registers of OSD processor 100 much more quickly than is possible with a parallel data transfer. FIG. 2 shows the major processing blocks of OSD processor 100. Note that there are three distinct buses (i.e., the SIO (serial interface bus); a first internal bus 201, and a second internal bus 202) within OSD processor 100. It is important to note the novel architecture in which the SIO bus, which is coupled to the VRAM for receiving serial data, is coupled to both an initialization block 200 and to an array of sixteen 13-bit color palette registers 270.

Crystal oscillator 230 generates a clock signal under control of crystal 101 of FIG. 1. The clock signal is applied to a skew corrector circuit 220, and to a timing generator circuit 210. Timing generator 210 also receives HSYNC and VSYNC (horizontal and vertical synchronizing) signals from the deflection unit of the television and provides two output clocks, one of which is skew corrected with respect to HSYNC, and the other of which is not. The purpose of skew correction is to synchronize the dot clock with Horizontal Sync from the television chassis in order to reduce jitter from frame to frame.

Initialization block 200 includes an array of registers for holding control data used by the other blocks, which data is conveyed to the other blocks via bus 201. An output controller block 240 determines when graphics data should be displayed. During blanking, and when instructed to do so by data stored in the initialization block, output controller 240 causes the RGB color signals and the Fast Blanking signal to assume a logic zero state. A Horizontal and Vertical Comparator block 250 determines the proper time in relation to raster scan for an OSD display. Horizontal and Vertical Comparator block 250 includes a line and pixel counter (not shown) for determining when the proper line number and pixel count occurs, at which time a control signal is generated and conveyed to output controller 240 and to an address generator block 280, via second internal bus 202. Horizontal and Vertical Comparator block 250 receives horizontal and vertical signal information from an Interlace Detector block 260.

Interlace Detector block 260 identifies field type (i.e., odd or even) and transmits this information to the Horizontal and Vertical Comparator block 250. Interlace Detector block 260 uses a "sliding detection window" with high and low threshold values. A delta around the region of the threshold is used to prevent small changes in VSYNC from adversely affecting the decision logic within Interlace Detector 260. Interlace Detector block 260 uses a 6-bit counter to determine the position of VSYNC relative to HSYNC. This count is used to determine the next field type (i.e., odd or even), which determination is updated at the end of every VSYNC. If the next field is even, the line counter is reset to zero, if the next field is odd, the line counter is set to one. The line counter will increment by two for interlaced operation and will increment by one for non-interlaced operation. The VI and HS bits in the frame control byte (shown in detail in FIG. 8b) are used to enable the interlace detector and set the horizontal scan rate.

Internal bus 201 also conveys information to an Address Generator and VRAM Control block 280 which generates the necessary VRAM addresses for reading the OSD display data via the serial SIO bus. OSD controller also includes a test circuit 290 which provides data during an ATE (automatic test equipment) mode of operation when a TEST pin is set to a high logic level (i.e., VDD). The address lines are used to define the type of data to be read out (i.e., if A8=VDD then RGB controller data is read out; if A8=VSS then VRAM controller data is read out). Test data is output on the thirteen RGB and Fast Blanking pins.

Color Palette block 270 contains sixteen 13-bit color palette registers. Each color byte in each register comprises four bits of red (R) color information, four bits of green (G) color information, four bits of blue (B) color information, and one bit to indicate whether on not transparency (T) is desired. A 13-bit palette color is stored according to the following format:

T R3 R2 R1 R0 G3 G2 G1 G0 B3 B2 B1 B0.

For example, a non-transparent full-magenta (i.e., maximum red plus maximum blue) palette color is stored as follows:

0 1 1 1 1 0 0 0 0 1 1 1 1.

With four bits per color, each color can be displayed with an intensity (i.e., saturation) range of sixteen steps from fully-off (0000) to fully-on (1111). Thus, OSD processor 100 is capable of displaying 16×16×16=4096 different possible shades of color, with and without transparency.

The pixel data stored in VRAM is actually the address of the color palette location in which the desired color for that particular pixel is to be found (i.e., a "color pointer"). Color information for two adjacent pixels are stored in each VRAM location because only four bits are need to uniquely address the sixteen palette locations. That is, the "color pointer" for pixel n+1 occupies bits 0 to 3 of a given VRAM location, and the "color pointer" for pixel n occupies bits 4 to 7 of that same VRAM location. Because OSD processor 100 produces a bit mapped display, the resolution of the display is directly proportional to the size of the memory used. A 1 Mbit memory can provide a resolution of 512×512 (i.e., 512 pixels per row and 512 rows displayed). A 2 Mbit memory can provide a resolution of 1024×512 (i.e., 1024 pixels per row and 512 rows displayed). A 4 Mbit memory (or an arrangement of two 2 Mbit memories) can provide a resolution of 1024×1024 (i.e., 1024 pixels per row and 1024 rows displayed). Magnification factors of 1×, 2×, and 4×are also provided in which horizontal resolution is maintained but vertical resolution is changed such that in 2×mode, a single line of VRAM data is repeated over two successive lines of video, and in 4×mode, a single line of VRAM data is repeated over four successive lines of video. This feature provides a usable display which potentially could cover much of the screen while conserving VRAM space.

FIG. 7 shows the first 48 bytes of row zero of VRAM 140. These 48 bytes represent the initialization data which needs to be transferred to OSD processor 100 at every vertical sync interval. The contents of the INIT BYTE are shown in detail in FIG. 8a, and the contents of the FRAME CONTROL BYTE are shown in detail in FIG. 8b. Row zero of VRAM 140 is reserved for all initialization data, which groups the initialization data together and prevents the occurrence of the above-mentioned "holes" in memory. The first allowed starting row for graphics data is row 1.

Figure 3:
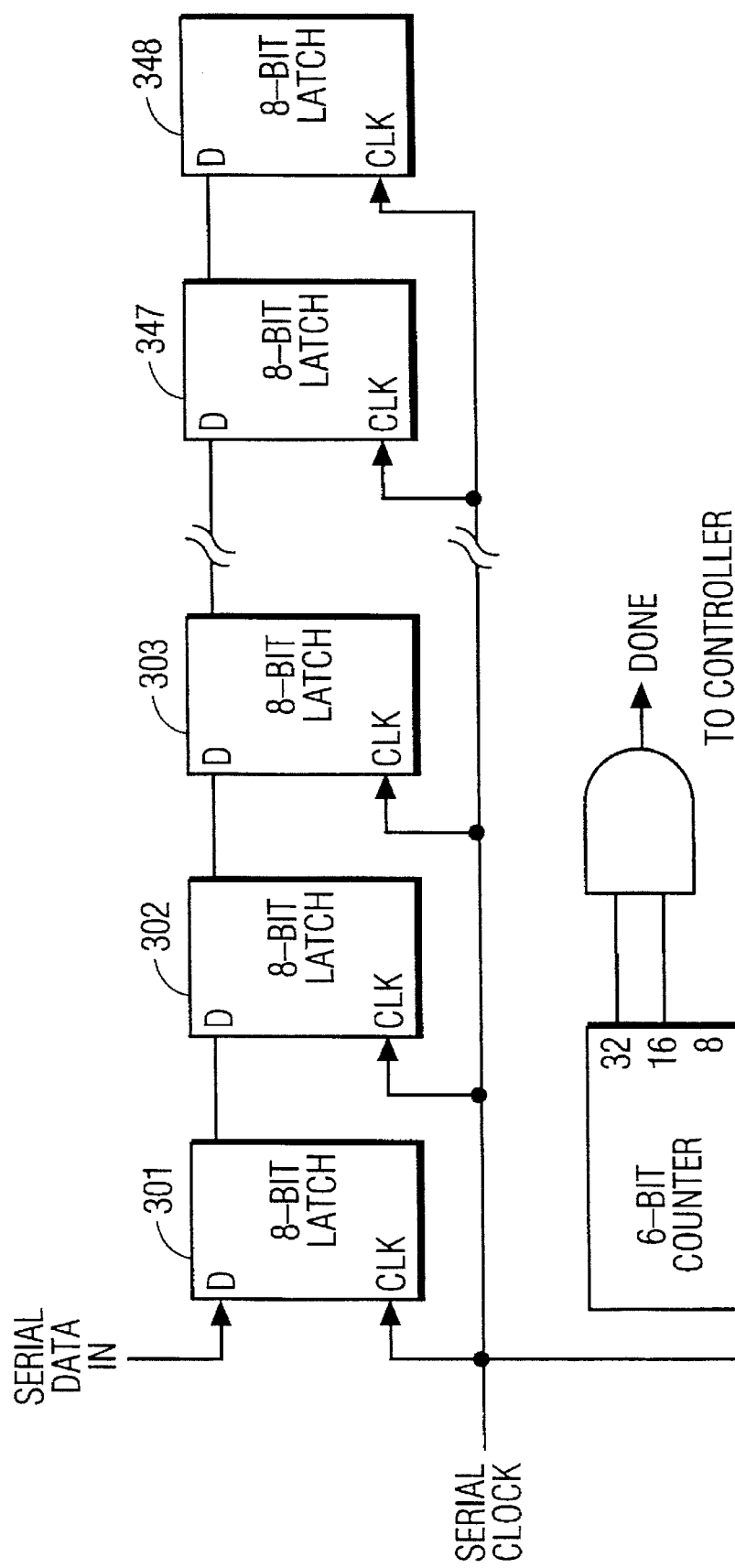
FIG. 3 is a simplified block diagram of one embodiment of the serial input port of the OSD device of FIG. 1.
Figure 4:
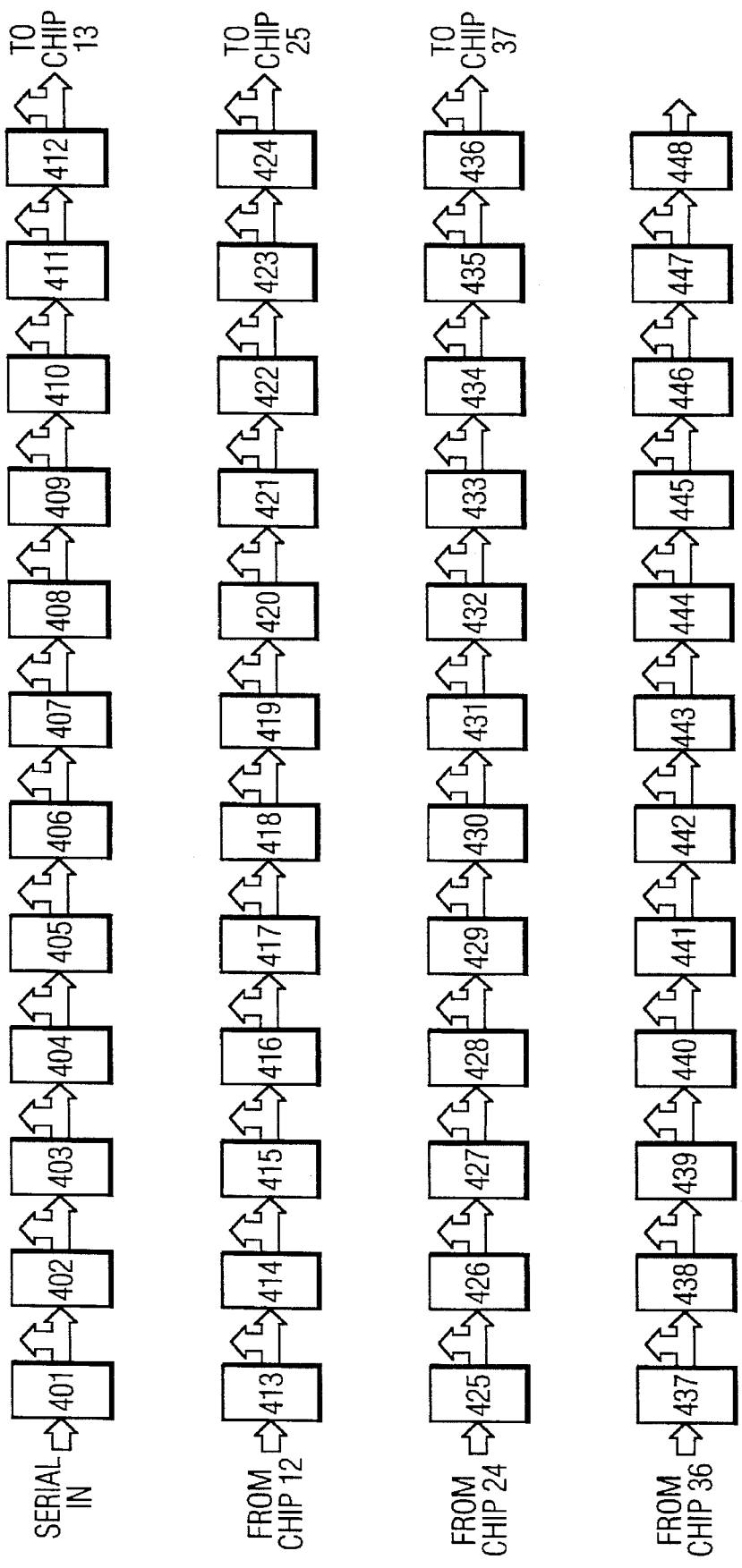
FIG. 4 shows, in block diagram form, a more detailed view of the latches of the serial input port of the OSD device of FIG. 1.

Transfer of the initialization data in accordance with the invention will now be described with reference to FIGS. 3, 4, 5, and 6. FIG. 3 is a generic representation of a series of 48 latches 301–348 for receiving serial initialization data from row zero of VRAM via the SIO bus. The SIO bus is 8-bits wide and conveys a byte of data from VRAM 140 at each positive-going serial clock transition. A six bit counter signals Address Generator and VRAM Controller block 280 when all 48 bytes have been transferred. There are several possible embodiments of the serial transfer apparatus. FIG. 4 shows 48 eight-bit one-stage serial shift registers for receiving the data. The bus connections with two arrow points signify that the data are transferred from one latch to the next on each transition of the clock. It is to be understood that a clock line is connected to all chips in parallel but is not shown, for simplicity. In the apparatus of FIG. 4, eight bits are presented to the eight inputs of a single stage shift register 401. After 48 clock cycles the first byte will be available at the output pins of register 448 and each of the other 47 bytes will be latched into a corresponding register.

Figure 5:
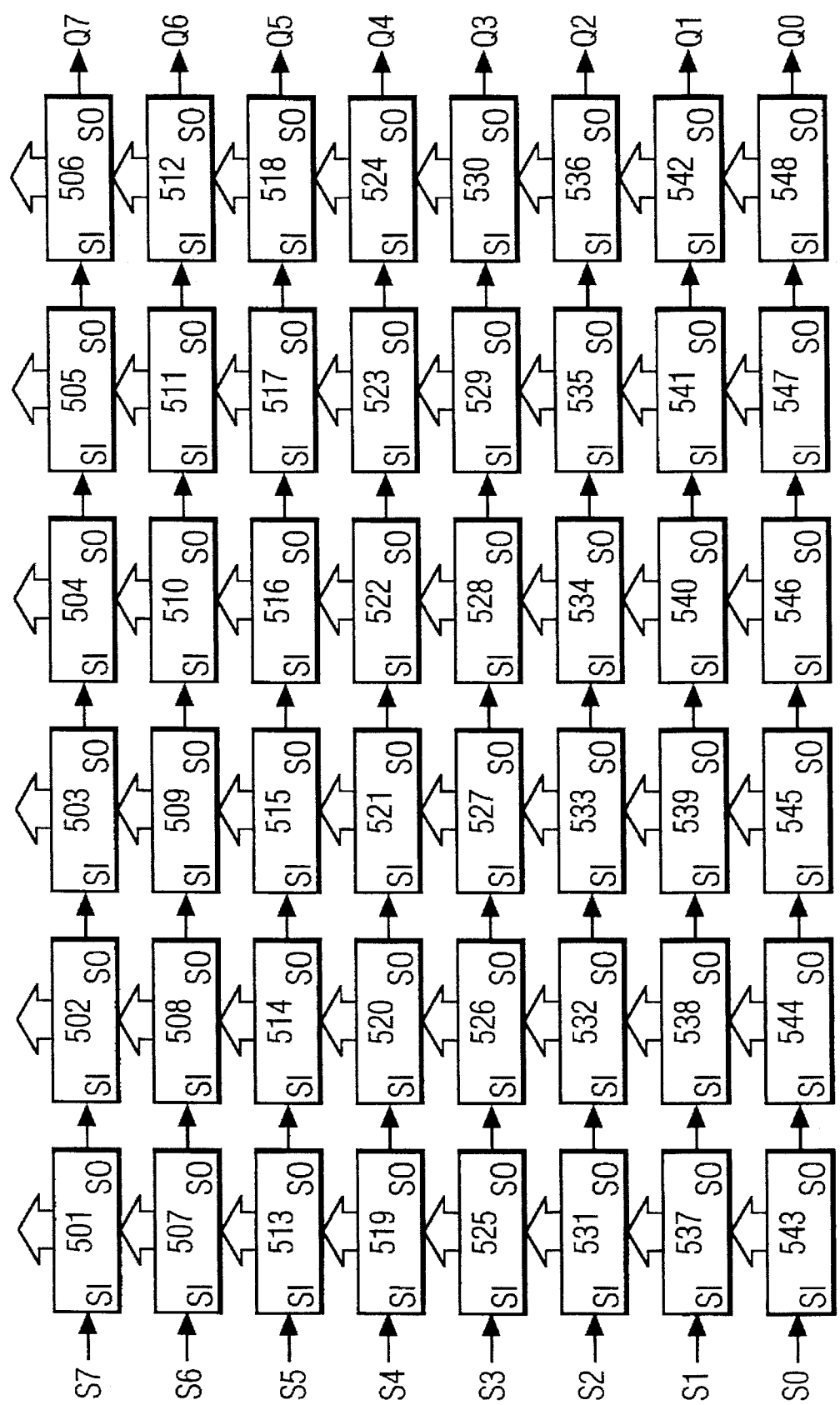
FIG. 5 shows, in block diagram form, a more detailed view of another embodiment of the latches of the serial input port of the OSD device of FIG. 1.

The apparatus of FIG. 5 shows 48 one-bit eight-stage shift registers, arranged in an array of eight rows with each row having six eight-stage registers. In the apparatus of FIG. 5, each row shifts in one of the eight bits of the serial data (i.e., S0–S7). After 48 clock cycles, the first byte will be available at the output pins of registers 506 (Q7), 512 (Q6), 518 (Q5), 524 (Q4), 530 (Q3), 536 (Q2), 542 (Q1) and 548 (Q0) and each of the other 47 bytes will be latched into corresponding registers in the same fashion. The broad bus arrows exiting each register indicate that the data are available in parallel from each register for loading into the appropriate registers of OSD processor 100. Such an eight-stage serial-in/parallel-out register is known from the CD4034A, manufactured by Harris Semiconductor, Inc., Sommerville, N.J.

Figure 6:
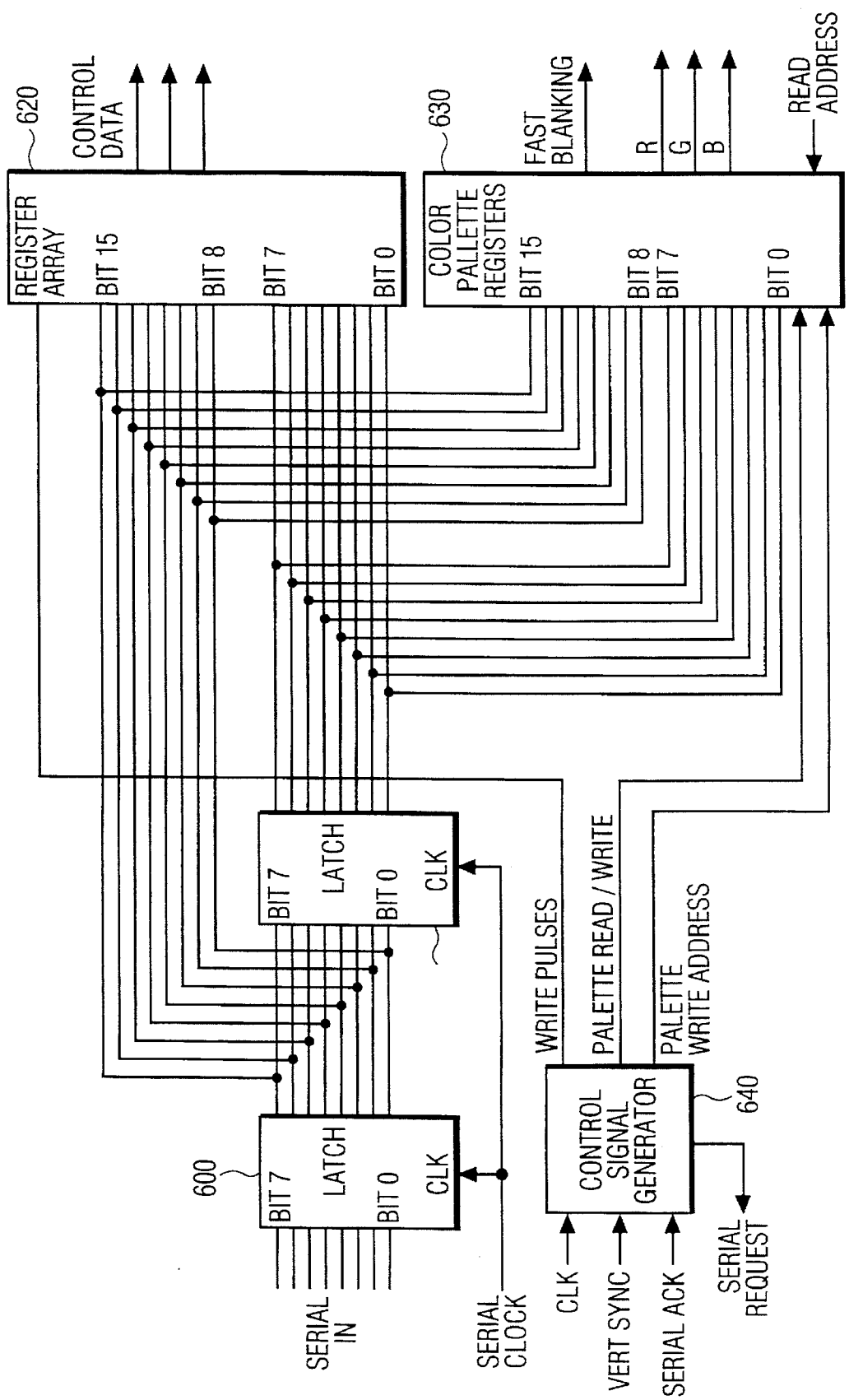
FIG. 6 shows, in block diagram form, yet another embodiment of the latches of the serial input port of the OSD device of FIG. 1.

Although each of the above-described arrangements is suitable for handling the serial data transfer, a preferred arrangement, in terms of integrated circuit chip area, is shown in FIG. 6. In FIG. 6, two bytes of data are latched in latches 600 and 610 in quick succession, and transferred to the appropriate control or palette register in control register array 620 and color palette register 630, respectively, under control of a Control Signal Generator 640. Control Signal Generator 640 generates the appropriate control signals for writing data to the registers. Thus, in apparatus according to the subject invention, serial transfer of the control and palette data is accomplished more quickly than could be accomplished via parallel reading of memory locations, thereby freeing System Bus 150 for use by Graphics μp 120.

As noted above, OSD processor 100 will use whatever data is stored in row zero of VRAM 140 as control and palette data, with that data being updated every vertical interval by Graphics μp 120. Unfortunately, when the television receiver is first powered-up, several vertical intervals may pass before Graphics μp 120 has an opportunity to load the correct data into row zero of VRAM 140. Until such data are loaded, the "data" in those locations consists of randomly set bits, which if acted upon as data would cause an undesirable screen display.

Recall that OSD processor 100 performs address decoding for Graphics μp 120. Thus, whenever Graphics μp 120 writes to VRAM 140, OSD processor 100 "knows about it". Therefore, it was decided that when the first "write" to any location of VRAM is detected by OSD processor 100, that "write" will be assumed to be a storage of control data to row zero. Thereafter, OSD processor 100 will begin a serial transfer of data upon the occurrence of the next vertical interval. That is, no serial transfer of control and palette information will be made until after the first write operation to VRAM 140 is performed by Graphics μp 120. Thus, no separate "data valid flag" needs to be transferred to advise OSD processor 100 that the data in row zero are current and correct.

The terms microcontroller, microprocessor, and controller, as used herein, are considered to be equivalent and interchangeable for purposes of the subject invention.

What is claimed is:

1. An on-screen display apparatus, comprising:

on-screen display means for generating an image signal for display on a display screen;

control means, coupled to said on-screen display means, for controlling said on-screen display means to produce said image signal;

memory means including a first area for storing image-representative data and a second area for storing control data for controlling said on-screen display means;

said memory means having an input/output port coupled to said control means and a serial output port coupled to said on-screen display means, said serial output port conveying said image-representative data from said first area of said memory means to said on-screen display means for processing and display;

said control means writing said control data to said second area of said memory means via said input/output port and said on-screen display means reading said control data from said memory means via said serial output port.

2. The on-screen display apparatus of claim 1 wherein, said memory means is a multiport video random access memory (VRAM), and said input/output port is a parallel port.

3. The on-screen display apparatus of claim 1 wherein, said memory means is organized as an array of memory locations comprising rows and columns, and said second memory area occupies a row of said memory means.

4. The on-screen display apparatus of claim 2 wherein, said control data includes initialization data for said on-screen display means, color palette information, border color information, starting line information, and ending line information.

5. An on-screen display apparatus, comprising:

on-screen display means for generating an image signal for display on a display screen;

control means, coupled to said on-screen display means, for controlling said on-screen display means to produce a desired display;

memory means coupled to said on-screen display means and to said control means for storing data representing an image to be displayed;

said memory means including a first area for storing said image-representative data and a second area for storing control data for said on-screen display means;

said memory means being a multiport video random access memory (VRAM), having a first port coupled to said control means and a second port coupled to said on-screen display means, said second port being a serial output port and being used by said on-screen display means for reading said image-representative data from said first area of said memory means for processing and display;

said control means writing said control data to said second area of said memory means and said on-screen display means reading said control data from said memory means via said second port and using said control data to control said generation of said image signal.

6. The on-screen display apparatus of claim 5 wherein, said first port of said memory means is a parallel port, and said second port is a serial port.

7. The on-screen display apparatus of claim 5 wherein, said on-screen display means produces a bit-mapped display.

8. An on-screen display circuit, comprising:

a color palette register array for storing color palette data;

a control register array for storing control data;

a serial input port, operating under control of a serial clock, coupled to said color palette register array and to said control register array for conveying color palette data and control data from an external source to a respective one of said registers at a rate determined by said serial clock, said serial input port also conveying pixel color information to said on-screen display circuit during a graphics display mode of operation.

* * * * *